United States Patent [19]

Albert

[11] Patent Number: 5,560,010

[45] Date of Patent: Sep. 24, 1996

[54] METHOD FOR AUTOMATICALLY GENERATING OBJECT DECLARATIONS

[75] Inventor: Anthony J. Albert, San Francisco, Calif.

[73] Assignee: Symantec Corporation, Cupertino, Calif.

[21] Appl. No.: 144,699

[22] Filed: Oct. 28, 1993

[51] Int. Cl.⁶ .................................................. G06F 9/44
[52] U.S. Cl. ...................... 395/700; 395/600; 364/255.5; 364/280.4; 364/DIG. 1
[58] Field of Search .................................... 395/650, 700, 395/600

[56] References Cited

U.S. PATENT DOCUMENTS

| | | | |
|---|---|---|---|
| 4,916,610 | 4/1990 | Bapat | 395/700 |
| 4,931,928 | 6/1990 | Greenfeld | 395/600 |
| 5,317,740 | 5/1994 | Sites | 395/700 |

*Primary Examiner*—Kevin A. Kriess
*Assistant Examiner*—John P. Chavis
*Attorney, Agent, or Firm*—Leo V. Novakoski; Edward J. Radlo

[57] ABSTRACT

A process for automatically generating declaration statements from the external definitions (I, II) of a source file (12). The process identifies the data-type identifiers of an external declaration (I, II, IV, V), converts user-selected data-type identifiers into data-type keywords, and stores them in a first memory location (38, 50). Object declarators of the external declaration are also identified and stored in a second memory location (49, 50). External declarations that are external definitions are identified and a declaration statement for each external definition is written to an EXTERN or STATIC include file using the stored data-type identifiers and object declarators. External declarations that are typedef declarations are identified and an entry is generated in a symbol table for converting user-selected data-type identifiers to data-type keywords.

10 Claims, 7 Drawing Sheets

METHOD FOR AUTOMATICALLY GENERATING OBJECT DECLARATIONS

TECHNICAL FIELD

This invention relates to the field of programming tools, and in particular to the field of programming tools for maintaining consistency between defined and declared variables and functions.

BACKGROUND ART

Block programming languages such as C are often used for creating new software, since they support the development of flexible, user-defined functions or modules. Typically, related functions, each of which performs a single, well-defined task, are combined into a source file. These source files can be developed independently and subsequently linked with other files to create a single software program. Communication among different source files is facilitated through global variables and functions, which are accessible outside the source file in which they are defined.

By default, the scope of a variable or function object extends outside the source file in which it is defined. Objects that are accessed by a source file outside the source file in which they are defined must be identified as External (EXTERN) objects in the accessing files. This is accomplished by means of a declaration statement in the accessing file, which introduces the name of the EXTERN object into the accessing file so it can be included in the file's symbol table. In contrast, objects that are to be accessible only within the source file in which they are defined must be identified as Static (STATIC).

Declarations apply to data and function objects, typedefs, structs, enums, and unions. A definition on the other hand, is a declaration in which a data object has storage allocated or in which the code forming the body of a function is present. Definitions apply only to data and function objects, and will be EXTERN or STATIC in accordance with the scope of the object defined.

Proper declaration statements in an accessing file must accurately identify both the name of the object and its data type. The name of the object is entered into the symbol table of the accessing file, so the file can be properly compiled. However, it is easy to inadvertently write inaccurate declaration statements, since programs typically contain many separate files, and these are often developed independently by different programmers. Under these circumstances, the likelihood of mismatches between the name or data type of an object as it is defined and as it is declared is greatly increased. For example, a variable or function may be modified in the file in which it is defined without modifying the corresponding declaration statements in the accessing files. As a result, the symbol table of each accessing file will include an incorrect entry for the object, and an error at run time may result.

One approach to minimizing such mismatches is to create a second file for each source file, which contains a declaration statement for each object defined in the source file. The second file, referred to as an "include" file, can be added to each source file that references objects in the original file during the compile process. This approach maintains in a single location the names of all objects in a source file which are to be made accessible outside the file. However, the is object names and data types must still be updated manually, and the risk remains that a change in the definition of an object will not be reflected in the declaration of the object in the corresponding include file. Methods for automatically generating declarations from the external definitions of a source file have only been developed for certain types of function definitions.

Typedef, struct, enum, and union declarations present their own set of consistency problems. For example, typedef declarations define user-selected identifiers to represent one or more data type keywords in the C language, and these identifiers are then used as data types in definitions, declarations, and other typedef declarations. Conflicts may arise, however, when the same user-selected identifier is used in different source files to represent different C data types. In this case, the corresponding include files contain different declarations for the same user-defined identifier, and if these include files are added to a third source file to provide declarations for some other objects, the resulting conflict between typedef declarations will prevent the source file from compiling.

For this reason, many programming projects limit the use of include files and write declarations into the source file itself specifically to avoid such conflicts. However, this approach creates many copies of a declaration which are scattered throughout different source files, and enhances the possibility that one or more declarations will be inaccurate if the object definition changes.

DISCLOSURE OF THE INVENTION

The present invention is a method for ensuring consistency between the external variables and functions defined in a source file (12) and the declarations of these external variables and functions in other source files, prior to actual compilation of the file (12). The method operates in conjunction with a compiler (14) to identify the data type and name of the objects in each external definition (I, II) comprising a source file (12), and to use this information to generate declaration statements (VI, VII) for each externally defined object. The data types are identified and temporarily stored in selected memory locations (38, 50) with any user-selected data type identifiers expressed in terms of C language keywords. Similarly, the declarator for each object, including function arguments and their declarations, are identified and stored in selected memory locations (38, 44, 50). As the decomposition of each external definition (I, II) is completed, the corresponding data type keywords and declarators are written to a new memory location (70) in a format appropriate for a declaration statement (VI, VIII). The process is continued until all external definitions (I, II) comprising a source file (12) have been analyzed and the corresponding declaration statements (VI, VIII) generated. These statements are then copied to an include file (152, 162), and the include file and original source file (12) are closed.

The present invention translates user-selected data type identifiers into C language keywords by analyzing typedef declarations to generate a symbol table for these user-selected identifiers. The symbol table (15) is scanned whenever a user-selected identifier is recognized in an external definition or declaration, and if an entry is found, the corresponding C language data type keywords are substituted for the user-selected identifier. In this way, external definitions (I, II) and typedef declarations (IV) can be generated in terms of C language keywords, eliminating any dependencies on typedef declarations (IV). In addition, while processing struct, union, and enum declarations, untagged declarations are identified, and if subsequently referred to in an external definition, warnings are generated identifying the file and line number of the untagged declaration and the file and line number of all the definitions that refer to it.

Include files (152, 162) generated by the present invention contain declarations (VI, VIII) which are created directly from the corresponding variable and function definitions, and thus automatically reflect any changes made to the definitions of these objects in the source file (12). The include files (152, 162) can then be incorporated into the other source files comprising the program by including appropriate pre-processor statements in these files. In this way, accurate, up-to-date declarations (VI, VIII) of global variables and functions will be provided to all source files.

DETAILED DESCRIPTION OF THE PREFERRED EMBODIMENTS

A typical C program comprises a number of source files, which are developed separately and then linked together into a single program. Source files consist of preprocessor directives intermingled with definitions and declarations. The preprocessor directives are interpreted by a preprocessor, whereas the definitions and declarations, which are collectively referred to as external declarations, are analyzed by a C compiler 14. For the purposes of the following discussion, external declarations which define functions or variables will be referred to as external definitions. It is the purpose of the present invention to generate accurate declaration statements for external definitions. The remaining external declarations are function and variable declarations and typedef, enum, structure, and union declarations. Function and variable declarations are ignored by the present invention, while the remaining external declarations, and particularly typedef declarations, are central to the method of the present invention, as discussed below.

The default scope of an object specified in an external definition, whether it is a variable or function, is the entire source file. Consequently, these objects can be accessed by any function or statement within the source file, and the contents of memory locations labeled by these object names persist during execution within the source file. In addition, if these objects are declared in other source files with an EXTERN storage-class-specifier, they may be accessed from these other files as well. The default scope of an object can be overridden by using a STATIC storage-class-specifier. In this case the scope of the object is explicitly limited to the source file in which it is defined.

Variable definitions are external declarations that specify the interpretation given to variables and reserve storage space for these variables. Variable declarations that do not begin with EXTERN are variable definitions. The general form of a variable definition is:

$$\text{declaration-specifiers init-declarator-list.} \qquad \text{(Eq. I)}$$

Here, declaration-specifiers represents the characteristics of the variables being declared, and the names of these variables are represented by declarators in init-declarator-list. In Eq. I and in all C statements that follow, the semi-colons which terminate C statements have been omitted.

Declaration-specifiers includes storage-class-specifiers (SCS), type-specifiers and type-qualifiers, which represent identifiers describing the scope, data type, and lifetime, respectively, of the variable. These identifiers may be either reserved C-language keywords or user-selected identifiers, defined to represent C-language keywords by means of typedef declarations. In the following discussion, these identifiers will be referred to generally as data-type identifiers or data-type keywords, depending on whether or not the user-selected identifiers have been replaced by the C-language keywords they represent.

Init-declarator-list includes one or more declarators, each of which comprises an identifier corresponding to the name of the variable being defined and, where necessary, pointer symbols or square brackets for pointer and array variables, respectively.

Similarly, function definitions are external declarations comprising a function declaration, declarations of the function arguments, and program control statements. Function definitions have one of the following formats:

$$\text{declaration-specifiers declarator compound-statements} \qquad \text{(Eq. IIa)}$$

or $$\text{declaration-specifiers declarator declaration-list compound-statements.} \qquad \text{(Eq. IIb)}$$

In both cases, the declaration-specifiers are as described above. However, declarators in function definitions differ from declarators in variable declarations. For example, in function definition IIa the function declarator includes an identifier corresponding to the function name, followed by a parameter-list in parentheses. The parameter list comprises a variable declaration for each function argument having the form:

$$\text{declaration-specifiers declarator.} \qquad \text{(Eq. III)}$$

In comparison, the declarator for a function definition IIb, which is an old style function definition, comprises an identifier corresponding to the function name followed by an identifier-list in parentheses. The identifier-list merely lists the names of function arguments. The declaration-list which follows the function declarator in a function definition IIb, includes a variable declaration similar in form to declaration III for each of these function arguments. In both types of function definitions II, compound-statements represents the code comprising the body of the function. The keywords and identifiers represented by compound-statements are not necessary for declaring functions, and consequently are disregarded in analyzing function definitions II.

A typedef declaration is initiated by the storage-class-specifier TYPEDEF, and as noted above allows the user to represent one or more C-language data-type keywords with user-selected identifiers. The general form for a typedef declaration is:

TYPEDEF declaration-specifiers init-declarator-list,    (Eq. IV)

where init-declarator-list comprises declarators corresponding to the user-selected identifiers. These identifiers can be used represent the data-type keywords included in declaration-specifiers in declarations, including other typedef declarations, and definitions. In particular, these user-selected identifiers appear in external definitions I, II. Therefor, in order to generate declarations for inclusion in accessing files, which do not depend on the typedef declarations used in the source file containing external definitions I, II, the user-selected identifiers of typedef declarations IV must be replaced by the C-language data-type keywords they represent.

Accordingly, the method of the present invention identifies the declaration-specifiers and init-declarator-lists of typedef declarations in the same manner in which external definitions I are analyzed. However, rather than generating declarations from the corresponding tokens, a symbol table 15 is generated in which each declarator in init-declarator-list indexes the data-type keywords in declaration-specifiers. When a user-selected identifier from a typedef declaration is included in an external definition I, II or another typedef declaration IV, reference to symbol table 15 provides the appropriate C-language data-type keywords. Thus, declarations generated for include files by the present invention are expressed only in terms of C language data type keywords.

Structure and union declarations declare user-defined data-types STRUCT, UNION. The representation Va is the form that the "type-specifier" component of declaration-specifiers takes for STRUCT or UNION declarations.

struct-or-union identifier '{'struct-declaration-list '}',    (Eq. Va)

where struct-or-union is one of STRUCT or UNION, and identifier is an optional tag. The method of the present invention keeps track of untagged declarations, and if an external definition I, II uses a struct or union which is declared without a tag identifier, a warning is generated which identifies the file and line number of untagged declaration Va and the external definition I, II that uses it. If no external definition I, II uses an untagged declaration Va, no action is taken, since such statements are acceptable in the C programming language. Enums are treated similarly, their format being:

ENUM identifier '{'struct-declaration-list '}'.    (Eq. Vb)

Figure 1:
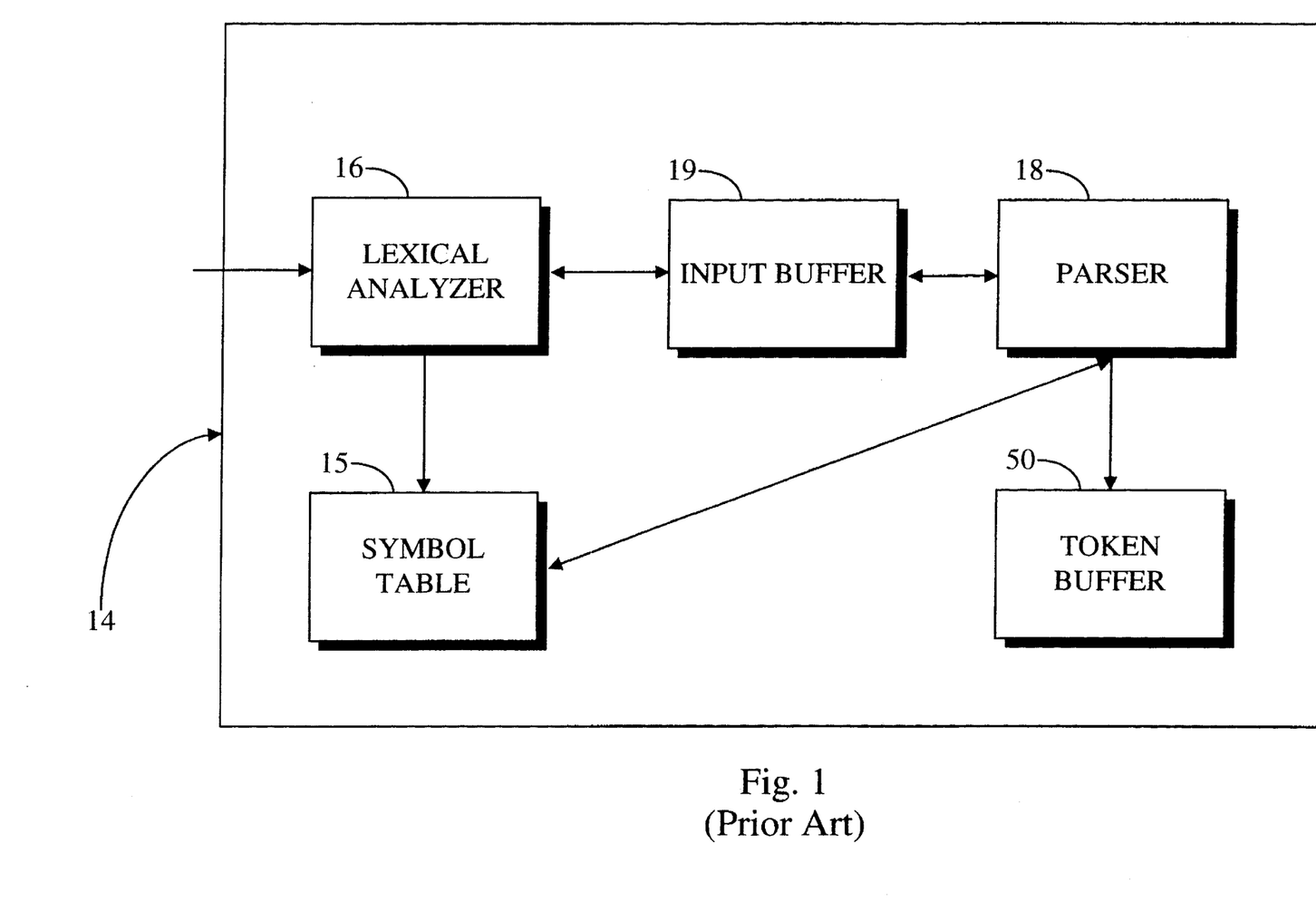
FIG. 1 is a schematic diagram of a prior art compiler (14), including a lexical analyzer (16), a parser (18), a symbol table (15), and a token buffer (50).

The method of the present invention takes advantage of the lexical and syntactical analysis capabilities of compilers to identify the names and data types of externally defined objects in a source file. Referring to FIG. 1, there is shown a schematic representation of a typical compiler 14. A lexical analyzer 16 generates tokens to represent the various keywords, object identifiers, and numerical constants that comprise each program statement. These tokens are passed to a parser 18 via input buffer 19 for syntactical analysis, and an entry is created in a symbol table 15 for each identifier.

Tokens corresponding to external definitions I, II and declarations IV, V being analyzed are accumulated in a memory location, 50, which is hereafter referred to as token buffer 50. Data-type keywords associated with each identifier are added to symbol table 15 as they are recognized by parser 18. The various compilation processes are well known in the art, and their details are not provided here.

The major difference between the method of the present invention and that described for compiler 14 is that the present invention generates entries in symbol table 15 only for typedef declarations IV. This is possible since the present invention is used prior to compilation, and only external definitions I, II and declarations IV, V are analyzed. Accordingly, it is not necessary to have entries in symbol table 15 for all identifiers, but only for those identifiers necessary to generate accurate declaration statements for external definitions I, II.

Thus, for each typedef declaration IV in source file 12, the declaration-specifiers of typedef declaration IV are entered in symbol table 15 at a location indexed by the declarators of typedef declaration IV. Subsequently, whenever lexical analyzer 16 recognized the user-selected identifier, a TYPE-NAME token is passed to compiler 14.

As parser 18 identifies data-type keywords and identifiers and the declarators to which they apply for each external definition I, II, or typedef declaration IV, the method of the present invention temporarily stores representations of these keywords and identifiers in selected memory locations. If a TYPE-NAME token is recognized by parser 18, the user-selected identifier is replaced by the corresponding C-language keywords in the declaration-specifiers. When parsing of an external definition I or II is completed, the stored keywords and identifiers are transferred to a buffer 70 in a format suitable for declaring the corresponding objects in an accessing file. The completed declaration statement is then written to an include file and the process repeated with the next external declaration. If instead a typedef declaration IV is being analyzed, the stored declaration-specifiers and declarators are used to generate an entry in symbol table 15 as described above.

Figure 2:
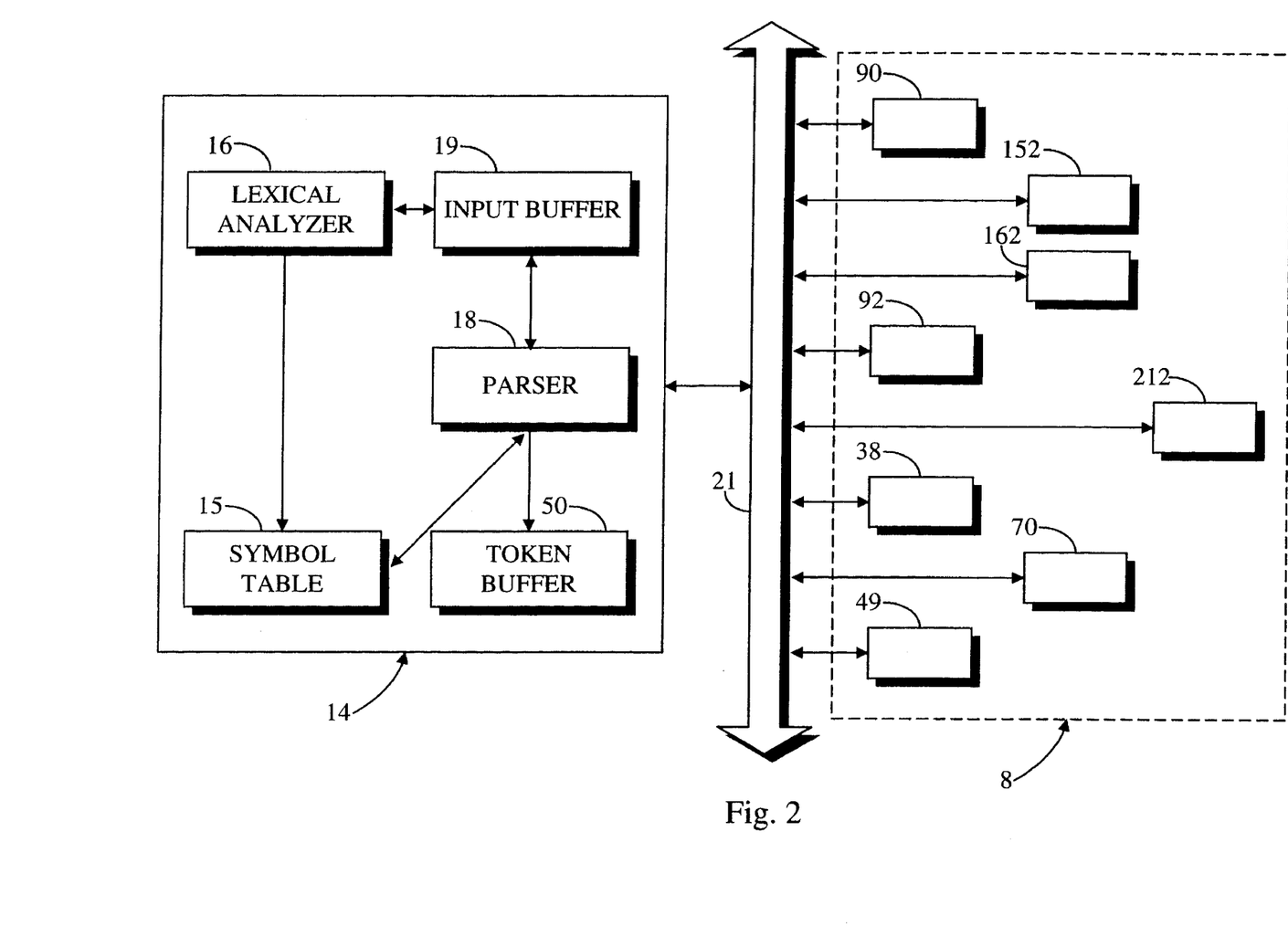
FIG. 2 is a schematic representation of the interaction between compiler (14) and memory (8) as governed by the method of the present invention.

Referring now to FIG. 2, there is shown a schematic diagram of compiler 14, bus 21, and memory 8. Memory 8 includes instructions for declarator and declaration-specifier identification processes 90, 92 as well as memory locations 38, 49, 212 and output buffer 70 for storage and manipulation of keywords and identifiers by the method of the present invention. Initially, areas of memory 152, 162 are set aside for storing declaration statements generated by the process, and the address of a source file 12 is passed to compiler 14. Throughout the process, tokens generated by lexical analyzer 16 for each external definition I, II and declaration IV, V are passed to parser 18 for analysis, and user-selected identifiers and C-language keywords from typedef declarations 14 are entered in symbol table 15 for future reference. Due to the different forms of variable definitions I, new function definitions IIa, old function definitions IIb, and declarations IV, V, tokens are moved among buffers 50, 70 and temporary memory locations 38, 49, 212 in different ways for each statement I, II, IV, V. This facilitates generation of declaration statements for external definitions I, II from their components and transfer of entries to symbol table 15 from typedef declarations IV.

For example, parser 18 accumulates tokens for data-type keywords in token buffer 50 for all statements I, II, IV, V until the data-type keywords of a declaration-specifier have all been transferred. If STATIC or TYPEDEF storage-class-specifiers are present, flags 34, 94 are set. Where a user-selected identifier is identified among the declaration specifiers, the corresponding C language keywords from symbol table 15 are automatically substituted so the resulting declaration statement will contain only C language keywords. Entries to symbol table 15 for user-selected identifiers are generated by analysis of TYPEDEF statements IV.

Once the declaration specifiers have all been identified, the next step depends on the type of statement I, II, IV, V being analyzed. Since variable definitions I and function argument declarations in declaration-list of function definitions IIb, have the same form (Eq. I), and neither is part of a function declarator, they are analyzed in a similar manner. Accordingly, instructions from declaration-specifier identification process 90 cause a representation of the data-type keywords of declaration-specifier to be transferred to temporary memory location 38 in both cases. Thereafter, tokens corresponding to the declarators of init-declarator-list are transferred to adjacent addresses in memory location 49 from token buffer 50 under control of declarator identification process 92. This continues until the last token of init-declarator-list is reached, at which point declaration statements are generated for each declarator in adjacent memory location 49 using the declaration-specifiers of memory location 38.

For variable definitions I, the contents of adjacent memory locations 49 are each transferred to output buffer 70 with the declaration-specifier from memory location 38 in a format suitable for declaring the variable from an accessing file. Declarations of function arguments in declaration-list of function definitions IIb are stored temporarily in an array 212 and transferred to output buffer 70 with the declaration-specifiers and function declarator of function definition IIb. Transfers to output buffer 70 maybe done for example using a formatted write statement, including an EXTERN storage-class-specifier.

For both function definitions II, tokens corresponding to the declaration-specifier and function declarator are accumulated in token buffer 50. When the last token of the function declarator is identified, a representation of the contents of token buffer 50 is transferred directly to output buffer 70 with a STATIC or EXTERN storage class specifier, according to the scope intended for the function. In the case of function definitions IIb, function argument declarations are transferred to output buffer 70 via memory location 212 as indicated above. The storage-class-specifier also determines to which of memory locations 152, 162 the contents of output buffer 70 are transferred. Typically, only STATIC storage-class-specifiers are specified for function definitions II, in which case the corresponding declaration is transferred to memory location 162. Declarations for variable definitions I and non-STATIC function definitions II are transferred to memory location 152. The process continues until all the external definitions I, II and declarations IV, V comprising source file 12 have been analyzed, the declaration statements corresponding to external definitions I, II generated, and any warnings for struct, enum, and union declarations V provided.

Figure 3:
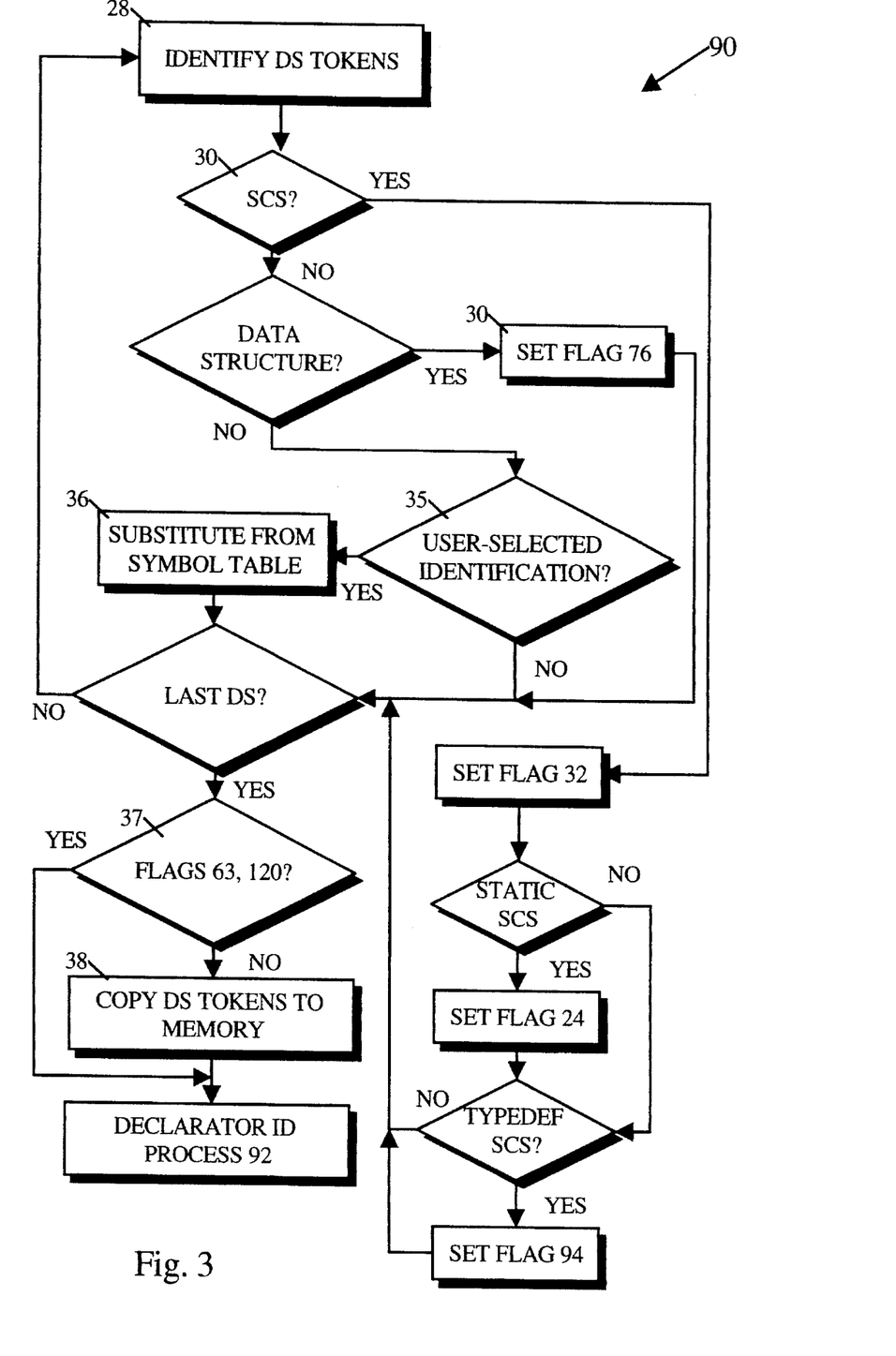
FIG. 3 is a flow chart detailing the process (90) by which data-type keywords are identified and stored in memory (8).

Referring now to FIG. 3, there is shown a detailed flow chart of the declaration-specifier identification process 90. In step 28 tokens corresponding to data-type keywords are accumulated in a token buffer 50, and certain types of storage-class-specifiers (SCS) are identified for storage and analysis purposes, beginning at step 30. Thus, a flag 32 is set whenever compiler 14 identifies a storage-class-specifier among the tokens. A second flag 34 is set if the storage-class-specifier is STATIC. A third flag 94 is set if the storage-class-specifier is TYPEDEF so the declaration-specifiers can be entered in symbol table 15 when the declarators corresponding to the user-selected identifiers of the TYPEDEF statement IV are identified in declarator-identification process 92. If a TYPE-NAME token is included among the tokens, symbol table 15 is checked in step 36 and tokens for the corresponding C-language keywords are substituted for the TYPE-NAME token in token buffer 50.

As noted above, data structures such as structs, enums, and unions may be declared with or without tags, which are identifiers that follow the struct, union, or enum specifier. However, generating a declaration for an external definition that refers to an untagged data structure is complex and unwieldy. For this reason, when a struct, union, or enum specifier is encountered at step 35 in declaration specifier identification process 90, a flag 96 is set so the struct, union, or enum declaration can subsequently be checked for the presence of a tag identifier.

Declaration specifier identification process 90 continues until compiler 14 indicates that all the data-type keywords of a declaration-specifier have been identified.

Storage of the declaration-specifier depends on whether the declarator to which it applies is a variable declarator in variable declaration I, a function declarator in function definition II, a function argument in function definition IIa, or a function argument in function definition IIb. For example, as noted above, variable declarations I and argument declarations for function definitions IIb each have similar formats: declaration-specifiers followed by a list of variable declarators represented by init-declarator-list. A declaration statement is generated for each declarator in init-declarator-list, and it is consequently easier to store and manipulate these declaration specifiers independently of the variable declarators to which they apply. On the other hand, if declaration-specifiers apply to function declarators or to function arguments in function definitions IIa, they are retained in token buffer 50 and manipulated with the declarator to which they apply.

Declaration-specifier identification process 90 relies on function and parameter flags 63, 120, respectively, to direct the storage of declaration-specifier at steps 37 according to the type of declarator to which they apply. Flags 63, 120 may be set during analysis of declaration-specifiers by allowing compiler 14 to look ahead at tokens on input buffer 19. Flag 63 indicates that the declaration-specifiers refer to a function declarator in a function definition II, while flag 120 indicates that the declaration-specifiers apply to a function argument in a function definition IIb. Thus, flags 63, 120 are checked in step 37 prior to storing the declaration-specifier tokens, and if neither is set, a representation of the declaration-specifier tokens is transferred from token buffer 50 to memory location 38 in step 39. On the other hand, if either flag 63, 120 is set, tokens corresponding to data-type keywords are retained in token-buffer 50. In all cases, the method then enters a declarator identification process 92.

Figure 4A:
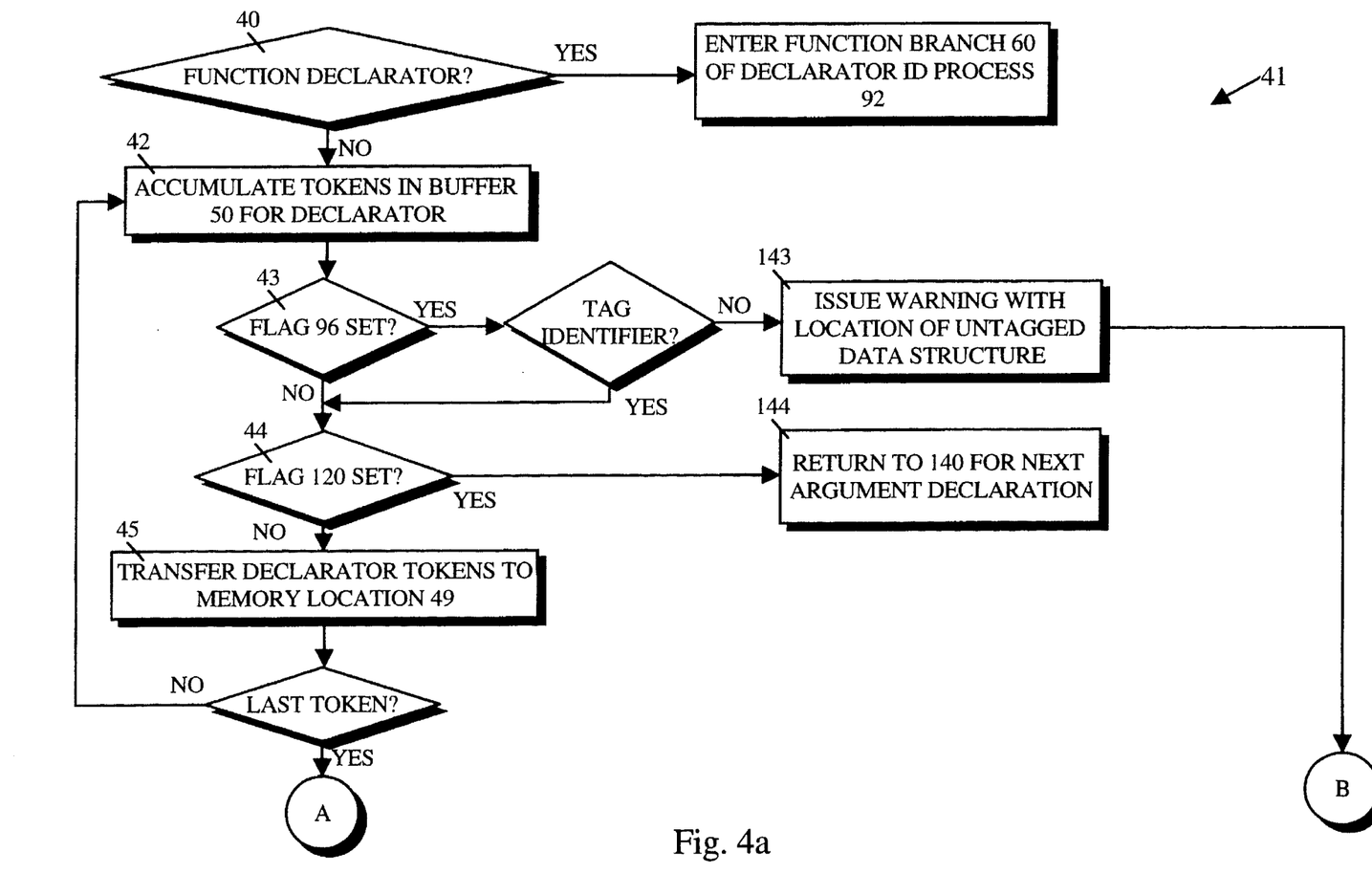
FIGS. 4A, 4B are detailed flow chart of the process (90) by which variable identifiers are identified and stored in memory (8).
Figure 4B:
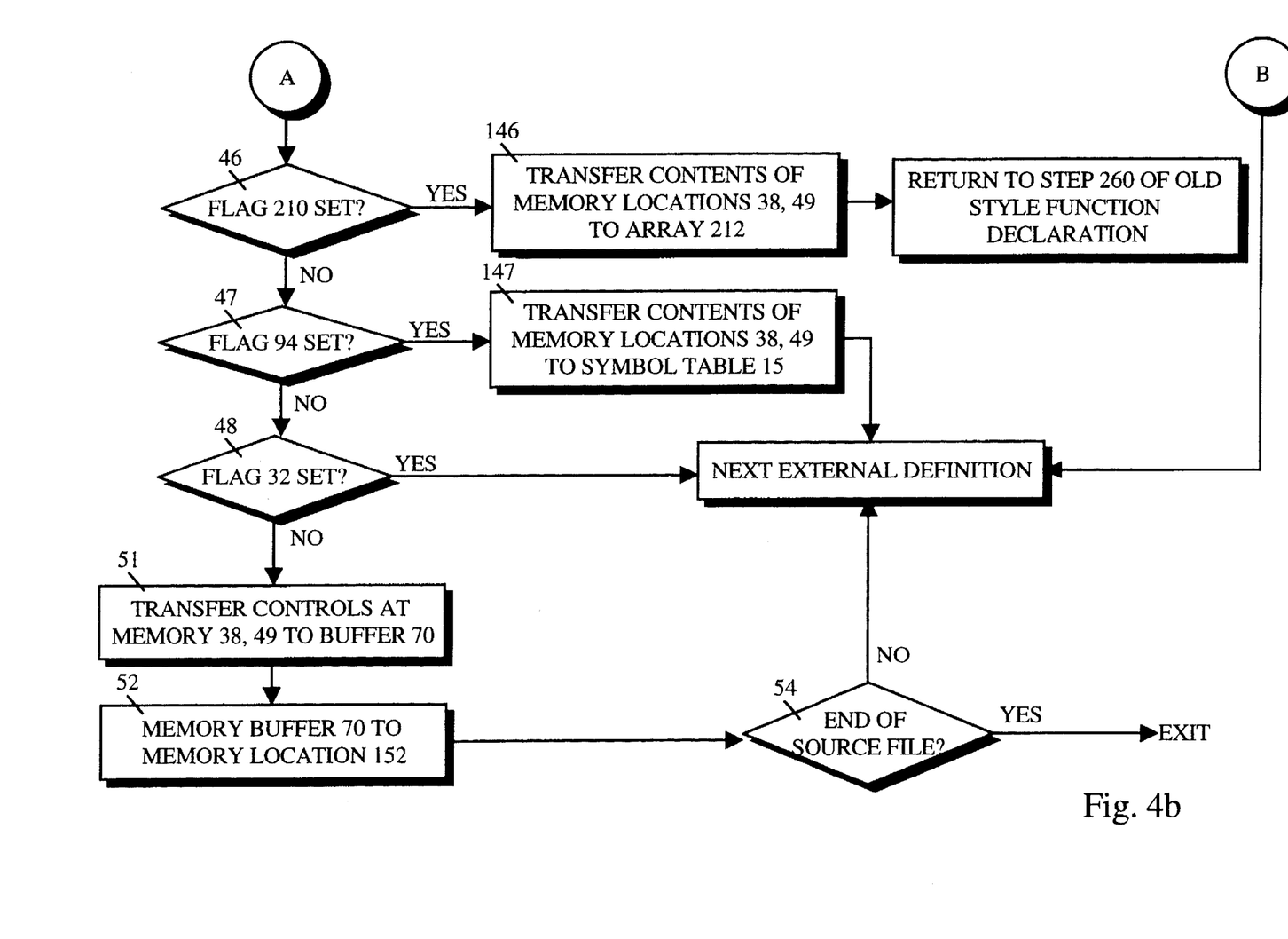

Referring now to FIGS. 4A, 4B, there are shown flow charts representing declarator identification process 92. In step 40 variable branch 41 or function branch 60 is selected depending on whether the next tokens correspond to a variable or a function declarator, respectively. As discussed below in conjunction with FIG. 5, the primary purpose of function branch 60 is to set flags 120, 210 to distinguish between function definitions IIa and IIb, and to call variable branch 41 as necessary to evaluate declarations of function arguments. Old style flag 210 like parameter flag 120 and function flag 63 is set in function branch 60 to bypass certain storage steps when variable branch 41 is entered during analysis of a function definition II.

In step 42 of variable declarator branch 41, the identifier corresponding to the variable name and any additional tokens, such as pointer symbols or square brackets for arrays, are accumulated in token buffer 50 until a complete declarator has been transferred. Alternatively, the tokens in buffer 50 may include a struct, union, or enum specifier, in which case data structure flag 96 will have been set in process 90. Accordingly, in step 43 data structure flag 96 is checked, and if it is set token buffer 50 is checked to determine whether or not a tag identifier follows the data structure specifier. If no tag is present, a warning is issued indicating an incomplete struct, enum, or union declaration V exists and providing its location in file 12. Process 92 is then exited and the next external definition I, II in source file 12 is analyzed. If a tag is present, no warning is issued and variable branch 41 is reentered.

The transfer of declarators in declarator-identification process 92 is directed by flags 120, 210 for variable or argument declarators, which are checked in steps 44 and 46, respectively. It is directed by flag 94 for declarators in TYPEDEF declarations IV, which is checked in step 47. Thus, if parameter flag 120 is set, the declarator represents a function argument in the parameter-list of a function declarator in function definition IIa. Accordingly, the declarator tokens are retained in token buffer 50, and the process shifts back to step 140 of function declarator branch 60 to analyze the next function argument.

When parameter flag 120 is not set, the declarator represents a variable in a variable definition I, a function argument declaration in the declaration-list of a function definition IIb, or a user-selected identifier in a TYPEDEF declaration IV. In these cases, a representation of the declarator is transferred from token-buffer 50 to the next available address in memory location 49, and the process is repeated until all declarators in init-declarator-list have been identified and temporarily stored.

When the last declarator in init-declarator-list has been identified and stored, memory locations 38, 49 contain representations of declaration-specifier and init-declarator-list, respectively, for external definitions I, typedef declarations IV, and declaration-lists of function definitions IIb. If old-style flag 210 is set, memory locations 38, 49 contain function argument declarations from the declaration-list of function definition IIb. At step 146, these are temporarily stored in an entry of array 212 indexed by the argument name from the identifier-list of the function declarator. If TYPEDEF flag 94 is set, at step 147 the contents of memory locations 38, 49 are entered into symbol table 15 with the declaration specifiers of memory location 38 at a location indexed by the declarators of memory location 49.

If none of flags 120, 210, 94 is set, the declarator represents a variable in a variable declaration I and flag 32 is checked in step 48 to determine whether declaration-specifier includes a storage-class-specifier. If flag 32 is set, the external declaration I is not a definition or is a Static variable declaration, so no new declaration statement is generated and analysis of the next statement in source file 12 begins. If flag 32 is not set, a variable declaration is written to output buffer 70 in step 51 for each of the variable declarators in adjacent memory locations 49, using the declaration-specifiers in memory location 38. The declaration statement has the following form:

EXTERN declaration-specifiers declarator.            (Eq. VI)

In step 52, each declaration statement VI is written to memory location 152 and compiler 14 checks whether the end of source file 12 has been reached in step 54. If it has, all files are closed. If not, the process repeats with the next statement in source file 12.

Figure 5:
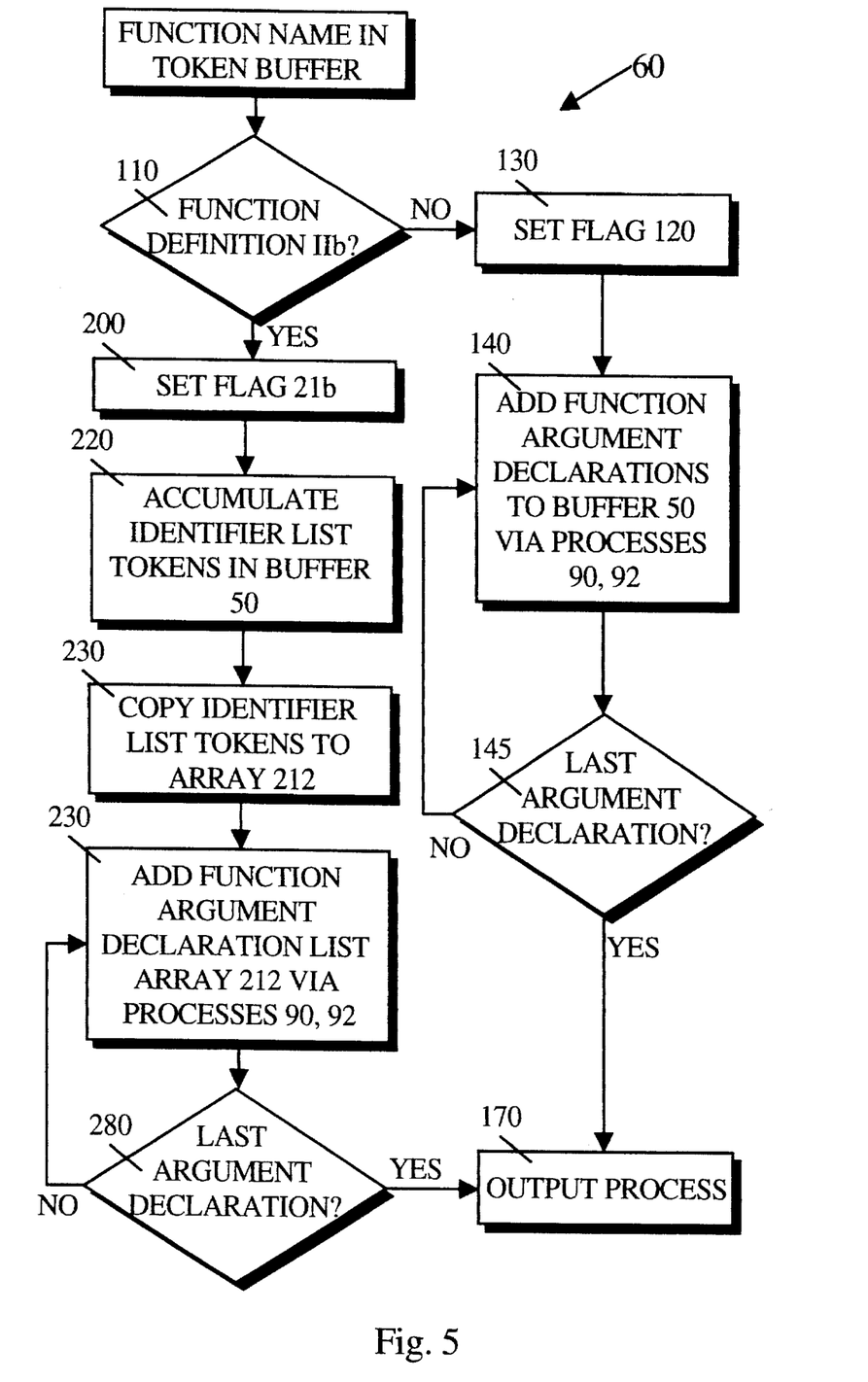
FIG. 5 is a detailed flow chart of the process (90) by which function declarators are identified and stored in token buffer (50).

Referring now to FIG. 5, there is shown a detailed flow chart for function branch 60 of declarator identification process 92, including its interaction with declaration-specifier identification process 90 and variable branch 41 of declarator identification process 92. For function definitions II, the first identifier following the declaration-specifiers is the function name, which is added to token-buffer 50 by parser 18. At step 110, it is determined whether the declarator corresponds to function definition IIa or IIb. This may be accomplished for example by allowing compiler 14 to examine tokens at its input buffer 15 until it determines whether a parameter-list or identifier-list follows the initial function identifier.

In the case of a new style function declarator, parameter flag 120 is set at step 130, and the argument declarations comprising the parameter list are analyzed in step 140 using the declaration specifier and declarator processes 90, 92. As indicated in FIG. 2, setting the parameter flag 120 bypasses transfer step 39 in declaration-specifier identification process 90 and transfer step 45 in declarator identification process 92, so that tokens corresponding to the declaration-specifiers and declarators of the function arguments are retained in token buffer 50. These tokens can be tracked for example by simply shifting a token pointer to the next address in token buffer 50 until all the tokens of function definition IIa have been analyzed.

As indicated in step 140 of FIG. 5 (and step 45 of FIG. 4A), the process loops through processes 90 and variable branch 41 of process 92 to accumulate tokens for the next argument declaration until at step 145, it is determined that all argument declarations in the function declarator are analyzed. This may be accomplished, for example, by allowing parser 18 to look at the next token in its input buffer 19, and to terminate step 140 if the token corresponds to the right parenthesis enclosing the declaration-list. At this point, token buffer 50 includes declaration-specifiers followed by the function name, and in parentheses, declaration-specifiers and declarators for each function argument. The function declarator is thus completely contained in token buffer 50. The transfer of the contents of token buffer 50 occurs in output process 170, which is discussed below in conjunction with FIG. 6.

Storage and retrieval of data keywords and function declarators for function definitions of type IIb are handled beginning with step 200 of the flow chart of FIG. 5, where old-style flag 210 is set when parser 18 recognizes an old-style function declarator. Tokens corresponding to the identifier-list of the function declarator are accumulated in token buffer 50 in step 220, and copied to selected memory locations 212 in step 230 until identifiers corresponding to all function arguments in identifier-list have been processed. At this point, the old-style function declarator is complete and contained in token buffer 50, while selected memory locations 212 are indexed by tokens corresponding to the identifiers in the identifier list of the function declarator.

Evaluation of the argument declarations in the declaration-list of old-style function definitions IIb commences at step 260, where the declaration-specifier identification process 90 and declarator identification process 92 are entered as described above. The function argument declarations in the declaration list of old-style function arguments are transferred to selected memory locations 212, in step 146 of the declarator identification process 92. In this way, the identifiers of the identifier-list of the function declarator index their corresponding function argument declaration, forming an array at memory location 212. This continues until all declarations in declaration list have been analyzed. When the end of declaration list is recognized in step 280, the process shifts and enters an output process 170.

Figure 6:
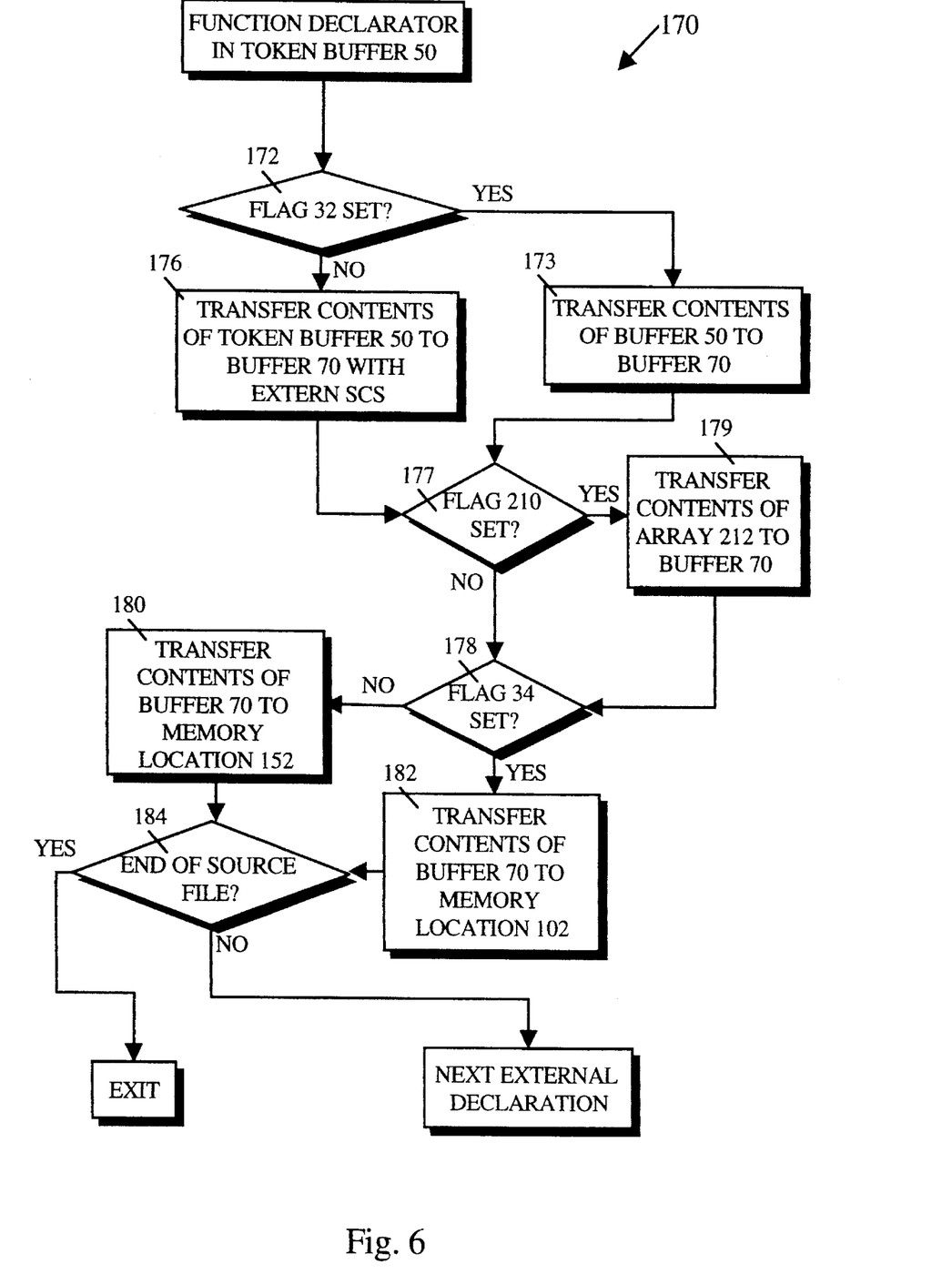
FIG. 6 is a detailed flow chart of the process (170) by which function declarators and old style function argument declarations are stored in memory (8).

Referring now to FIG. 6, there is shown a flow chart representing output process 170. Transfer of the contents of token buffer 50 for function definitions IIa, IIb depends on whether or not the declaration-specifier preceding the function declarator in function definition II includes a storage-class-specifier, and if it does, whether it is EXTERN or STATIC. Accordingly, in step 172, storage-class-specifier flag 32 is checked, and if it is set the contents of token buffer 50 are transferred directly to output buffer 70 at step 173. In this case, the format of the declaration statement generated is:

$$\text{declaration-specifier declarator,} \qquad \text{(Eq. VII)}$$

where, declaration-specifiers includes a storage-class-specifier. Typically, function definitions II only include storage-class-specifiers if they are to be declared STATIC. However, the method described accommodates EXTERN storage-class-specifiers as well. EXTERN and STATIC function definitions II are distinguished at step 178 by checking static flag 34 as discussed below.

If storage-class-specifier flag 32 is not set, function definition II does not include a storage-class-specifier for the function declarator, and the default format of the declaration statement is:

$$\text{EXTERN declaration-specifiers declarator.} \qquad \text{(Eq. VIII)}$$

Declaration statement VIII may be generated by transferring the contents of token buffer 50 to output buffer 70 by for example including an "EXTERN" storage-class-specifier in a formatted write process as indicated in step 176.

In order to accommodate old style function definitions IIb, flag 210 is checked at step 177 and if it is set the declarations in array 212, which correspond to the function argument declarations in declaration-list of function definitions IIb, are transferred to output buffer 70 in step 179. If flag 210 is not set, the function definition II is a new style function definition IIa, and buffer 70 already contains the complete declaration VII or VIII.

The contents of output buffer 70 are subsequently copied to memory location 152 at step 180 or to memory location 162 at step 182 depending on whether STATIC flag 34 is set when it is checked at step 178. Memory locations 152 and 162 correspond to include files 150 and 160, respectively, for Extern and Static declarations. The method then checks for the end of source file 12 at step 184 and stops or continues depending on whether or not the last external definition has been analyzed.

The storage and identification processes represented in FIGS. 2–6 can be implemented with a parser generator. For example, a YACC parser generator automatically generates parse tables and maps for analyzing language structures such as external definitions I, II, when provided with a grammar for the source language. YACC parser generators allow the inclusion of "semantic actions" following production in the grammar provided to the generator. These are program statements that are executed whenever the corresponding production is used to reduce the stack of compiler 16. In this way, the method of the present invention is readily implemented in a computer-based system.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the invention.

What is claimed is:

1. A computer-implemented process for generating declaration statements for objects defined in the external declarations of a source file, the process comprising the steps of:

identifying data-type identifiers in an external declaration of the source file;

storing a representation of the data-type identifiers as data-type keywords in a first memory location;

identifying object declarators in the external declaration;

storing a representation of the object declarators in a second memory location;

determining whether the external declaration is an external definition or a typedef declaration;

when the external declaration is an external definition, combining the data-type keywords in the first memory location and the object declarators in the second memory location to generate a declaration statement;

when the external declaration is a typedef declaration, generating an entry in a symbol table with the data-type keywords from the first memory location, indexed by the object declarators from the second memory location;

and repeating the preceding steps until all external declarations of the source file have been analyzed.

2. The process of claim 1, wherein the step of storing data-type identifiers as data-type keywords in the first memory location comprises:

determining whether the data-type identifier is a data-type keyword;

when the data-type identifier is not a data-type keyword, scanning the symbol table for an entry indexed by the data-type identifier in the external declaration; and replacing the data-type identifier in the first memory location with the data-type keywords indexed by the data type identifier in the symbol table.

3. The process of claim 1, wherein the step of determining whether an external declaration is an external definition or a typedef declaration, comprises the substeps of:

identifying an external declaration as a function definition when the object declarator is a function declarator;

identifying an external declaration as a variable definition when the object declarator is not a function declarator and the data-type keywords do not include a storage-class-specifier; and identifying an external declaration as a typedef declaration when the data type keywords include a TYPEDEF storage-class-specifier.

4. The process of claim 3, wherein the step of identifying an external declaration as a function definition comprises the substeps of:

identifying a function definition as a STATIC function definition when a STATIC storage-class-specifier is among the data-type keywords;

identifying a function definition as an old style function definition when an object declarator includes an identifier-list; and identifying a function definition as a new style function definition when an object declarator includes a parameter-list.

5. The method of claim 4, wherein the step of combining the data-type keyword in the first memory location and the object declarators in the second memory location to generate a declaration statement comprises writing the data-type keywords and object declarator to a first include file when a STATIC function definition is identified and to a second include file when a non-STATIC function definition is identified.

6. The process of claim 5, wherein the steps of storing representations of the data-type identifiers and object declarators in first and second memory locations comprise storing representations of data-type identifiers and object declarators in adjacent memory locations in a token buffer of the computer when the external declaration is a function definition.

7. The process of claim 6, wherein the step of identifying object declarators comprises the substeps of identifying data type identifiers, storing the data-type identifiers as data type keywords, identifying object declarators, and storing object declarators for each function argument when the external declaration is a new style function definition.

8. The method of claim 7, wherein the step of identifying object declarators comprises the substeps of identifying data type identifiers, storing the data-type identifiers as data type keywords, identifying object declarators, and storing object declarators for each function argument following an old style function definition when the external declaration is an old style function definition.

9. The method of claim 1, further comprising the steps of:
determining whether an external declaration is a struct, union, or enum declaration;
when a struct, union, or enum declaration is identified, determining if the object declarator includes a tag; and
generating a warning message when no tag is present.

10. The method of claim 9, wherein the step of determining whether an external declaration is a struct, union, or enum declaration comprises determining whether the data-type identifiers of the external declaration include a STRUCT, UNION, or ENUM type-specifier.

* * * * *